(12) United States Patent
Firman

(10) Patent No.: US 7,476,265 B2
(45) Date of Patent: Jan. 13, 2009

(54) BULK BAG UNLOADING SYSTEM

(75) Inventor: Barton Firman, Lewisville, NC (US)

(73) Assignee: The Young Industries, Inc., Muncy, PA (US)

(*) Notice: Subject to any disclaimer, the term of this patent is extended or adjusted under 35 U.S.C. 154(b) by 547 days.

(21) Appl. No.: 11/151,537

(22) Filed: Jun. 14, 2005

(65) Prior Publication Data

US 2006/0283880 A1   Dec. 21, 2006

(51) Int. Cl.
*B65G 53/66* (2006.01)

(52) U.S. Cl. .................. 55/385.1; 222/105; 222/478; 222/500; 222/630; 222/181.3; 383/22; 383/906; 406/85; 406/109; 406/121; 406/130; 406/135; 406/171

(58) Field of Classification Search ............... 55/385.1; 222/105, 478, 500, 630, 181.3; 383/22, 906; 406/85, 109, 121, 130, 135, 171

See application file for complete search history.

(56) References Cited

U.S. PATENT DOCUMENTS

| | | | | |
|---|---|---|---|---|
| 3,620,575 A | * | 11/1971 | McIver et al. | 406/16 |
| 4,167,235 A | * | 9/1979 | Green | 222/105 |
| 4,889,452 A | * | 12/1989 | Heyl | 406/85 |
| 6,936,085 B2 | * | 8/2005 | DeMarco | 55/324 |
| 6,986,625 B2 | * | 1/2006 | Witheridge | 406/85 |
| 2005/0274094 A1 | * | 12/2005 | DeMarco | 55/356 |

* cited by examiner

*Primary Examiner*—Jason M Greene
*Assistant Examiner*—Minh-Chau T Pham
(74) *Attorney, Agent, or Firm*—Novak Druce & Quigg LLP

(57) ABSTRACT

A bulk bag unloading system generally consisting of a support means; a hopper mounted on the support means; filtering means mounted on the support means at a level above the hopper; means intercommunicating the interior of the hopper and an inlet of the filtering means; a means for suspending the bulk bag on the support means wherein a spout of the bulk bag communicates with an inlet of the hopper.

20 Claims, 2 Drawing Sheets

BULK BAG UNLOADING SYSTEM

This invention relates to a system for unloading fluidizable material from a portable bulk container, and more particularly to such a system which is highly effective in providing a steady flow of material being unloaded from a container and capturing airborne particles of such material within and without such system.

BACKGROUND OF THE INVENTION

In the prior art, systems used to unload portable containers of fluidizable material typically have consisted of a support frame structure, a hopper mounted on such structure, means for suspending the container on the support structure for gravity feeding material from the container into the hopper and a filter for capturing the products of material becoming airborne in the hopper as a result of the material flowing into the hopper. In such systems, it has been found that as a result of the positioning of the filter relative to the hopper, the filter media quickly become clogged, correspondingly decreasing the efficiency of the filter, and further that as a result of the positioning of the container being unloaded, a significant amount of the material being gravity fed from the container into the hopper, becomes airborne, not only contaminating the ambient atmosphere affecting the health of operating personnel but resulting in loss of material. It thus is the principal object of the present invention to provide such a system in which material unloaded from a portable container into a hopper will gravity flow freely and steadily, and particles of such material becoming airborne in the feeding process will be prevented from escaping into the ambient atmosphere, prevented from diminishing the effectiveness of the dust control equipment and captured to enhance productivity.

SUMMARY OF THE INVENTION

The principal objective of the invention is achieved by providing a bulk bag unloading system generally consisting of a support structure, a hopper mounted on the support structure, a filter apparatus mounted on the support structure at a level above the hopper, a chute intercommunicating the interior of the hopper and an inlet of the filter apparatus and a mechanism for supporting the bulk bag on the support structure so that a spout of the bulk bag communicates with the inlet of the hopper for gravity feeding material from the bag into the hopper. Preferably, such system includes a pan supported on the hopper, having an opening therein through which the spout of the bulk bag suspended on the support structure projects for gravity feeding material into the hopper, and a manifold disposed between the pan and the hopper providing a peripheral chamber with peripherally spaced inlets and outlets communicating through conduits with the inlet of the filter apparatus, which functions to draw airborne particles of material being unloaded and escaping between the pan and the bag being unloaded and convey such captured particles to the filter apparatus to be recovered and deposited within the hopper. It further is preferred that the inlet of the chute conveying airborne particles to the filter apparatus be located at an upper end of the hopper so that the bulk of the material being gravity fed into the hopper will not obstruct the inlet of the chute. In addition, the outlet of the hopper may be connected to a conventional pneumatic conveying line, and a product pump or rotary valve may be provided between the hopper and the pneumatic conveying line.

DETAILED DESCRIPTION OF AN EMBODIMENT OF THE INVENTION

Figure 1:
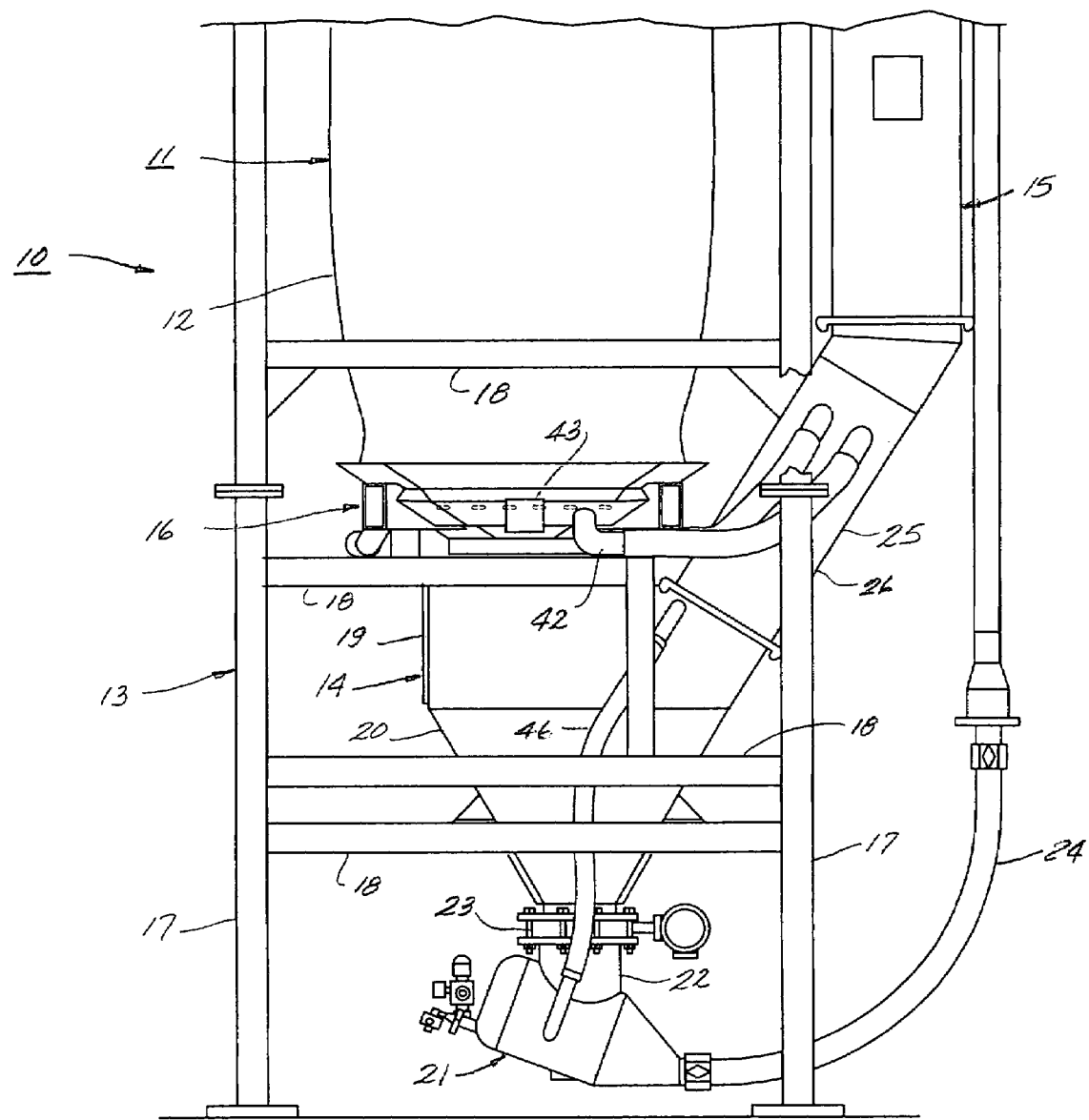
FIG. 1 is a side elevational view of an embodiment of the invention, having an upper portion thereof broken away.

Referring to FIG. 1 of the drawings, there is illustrated a system 10 for unloading a portable bulk bag 11 filled with a fluidizable, bulk material. The bag generally is formed of a flexible material, having a peripheral side wall 12, a closed upper end provided with a set of straps for suspending the bag and a bottom wall provided with a spout which may be closed and secured in such condition when the bag is filled and opened when the bag is suspended and the material therein is to be unloaded by allowing the material to be gravity fed through the spout. Typically, bulk material loaded in such bags is fluidizable and when unloaded by gravity flow through the spout, many of the particles thereof tend to become airborne and thus contaminate the ambient atmosphere about the lower end of the bag.

System 10 is functional to support and unload bulk bag 11 and generally consists of a support frame structure 13, a hopper 14 supported on the frame structure, a filter 15 supported on the support frame structure, a pan assembly 16 mounted on the hopper and a mechanism (not shown) provided on the upper end of the support frame structure for suspending a bulk bag to be unloaded by the system. The support frame structure consists of a set of upright structural members 17 interconnected by a number of crossbeams 18 having sufficient strength to support various components of the system and a fully loaded bag to be unloaded. Hopper 14 is supported on a set of crossbeam members within the confine of the upright structural members and includes an upper section 19 and a lower, converging section 20 having a lower outlet opening. The outlet of hopper 19 is connected to a product pump 21 by means of a conduit 22 provided with a valve 23. The outlet of product pump 21 is connected to a pneumatic conveying line 24 for transporting material unloaded from a bag 11 to another site which may consist of another storage site, a transport container or process equipment. Product pump 21 may consist and operate in the manner of the pump assembly described in U.S. Pat. Nos. 4,770,611 and 4,889,452 which are incorporated herein by reference. Such pump assembly generally functions in a manner whereby positive and atmospheric pressure alternately are applied to a chamber thereof to cause material to be received therein and then propelled through the pneumatic conveying line.

Filter 15 may be of a conventional type provided with a plenum chamber having an inlet and a tube sheet provided with a plurality of outlets, a plurality of filter elements disposed within the plenum chamber, mounted on the tube sheet with the interiors thereof communicating with such outlets and a filter medium mounted on the support structures thereof, means for applying for a negative pressure through the outlets of the filter elements to cause particle laden air to be drawn through the filter media and have such particles deposited thereon, and a set of nozzles for periodically injecting bursts of air through the filter elements to dislodge particles deposited thereon. Types of such filters are illustrated and described in U.S. Pat. Nos. 3,204,390, 3,377,783 and 4,889,452 which are incorporated herein by reference. Filter 15 is positioned above the level of hopper 14 and laterally of the position of a bag 11 when mounted on the support frame structure as shown in FIG. 1. The lower inlet of filter 15 communicates with an upper, side portion of the interior of hopper 14 by means of a conduit 25. Such conduit is disposed at an obtuse angle relative to the horizontal and is provided with a bottom wall 26 which is in general alignment with the angle of lower section 20 of the hopper. In such arrangement, with fluidizable material being gravity fed into hopper 14 and a negative pressure being applied to the filter elements of filter 15, airborne particles within the hopper will be drawn up to conduit 25 into the plenum chamber of the filter and filtered out. Upon burst of air being periodically injected into the filter elements, material dislodged from the filter media will be caused to gravity fall through conduit 15, into the hopper. With the filter in the elevated position relative to the hopper and the inlet of conduit 26 being disposed in the upper end of the hopper, material fed into the hopper will not obstruct and thus cause to interfere with the filtering action of the filter elements of the filter and only airborne particles within the hopper will be drawn up into the plenum chamber of the filter.

Figure 2:
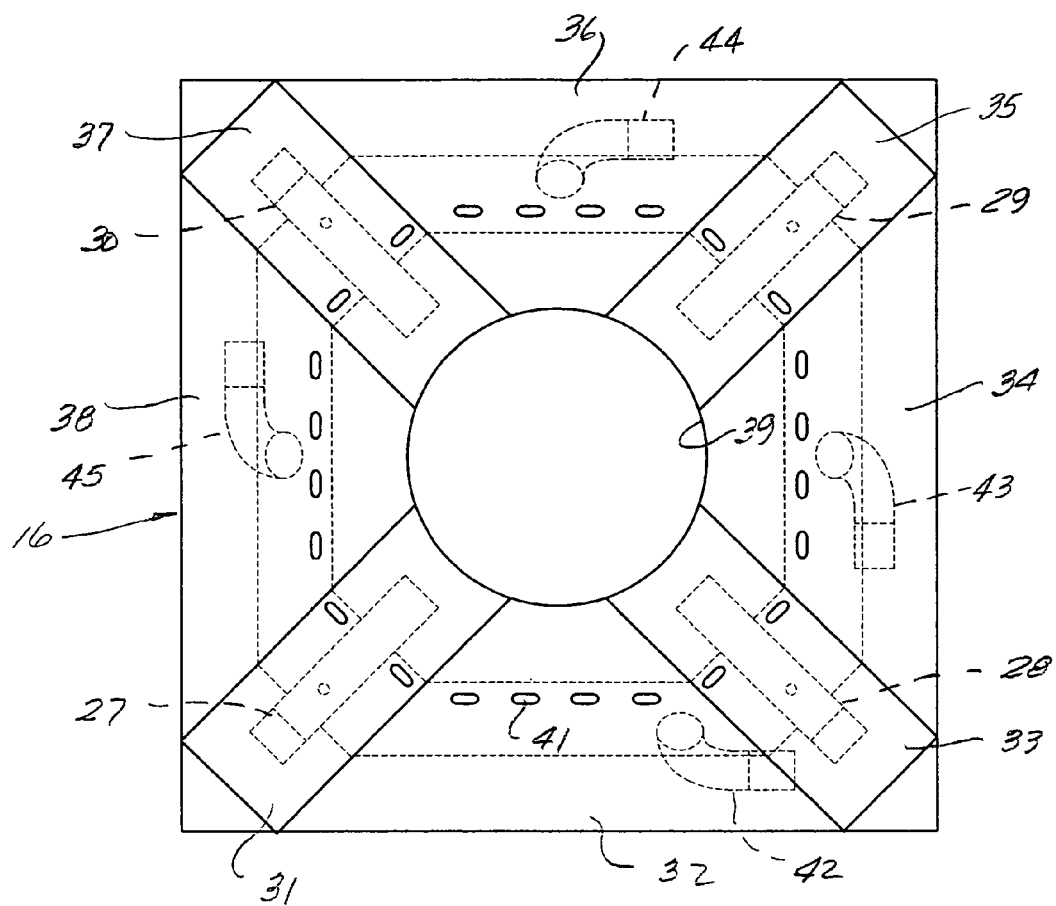
FIG. 2 is an enlarged top plan view of the bulk bag support pan shown in FIG. 1.
Figure 3:
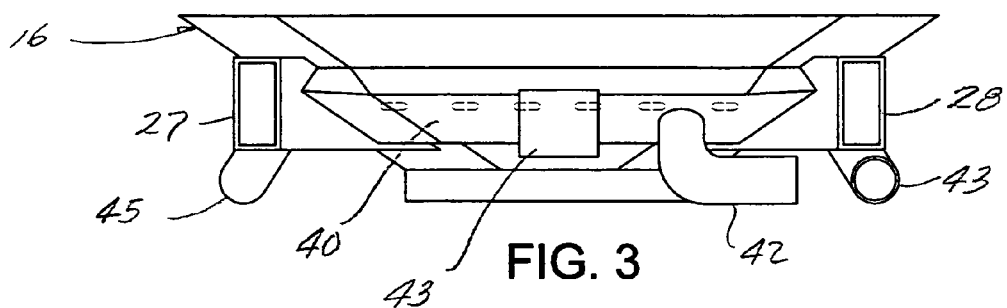
FIG. 3 is a side elevational view of the pan shown in FIG. 2.

The function of pan assembly 16 is to provide an annular shoulder for supporting the lower end of bag 11 about the spout thereof, provide a guide therethrough for the spout portion of the bag and retrieve any airborne and other material escaping from the material being unloaded from the bag into the hopper. As best shown in FIGS. 2 and 3, the pan assembly includes a set of circumferentially spaced, radially disposed support members 27 through 30 supported on frame structure 13, a plurality of pan sections 31 through 38 joined together, supported on support members 27 through 30 and sloping downwardly and inwardly toward an axially disposed circular opening 39. Depending from the pan sections and further secured to support members 27 through 30 is a peripherally disposed housing 40 which cooperates with the pan sections to provide a peripheral chamber about opening 39. As best shown in FIG. 2, the pan sections are provided with a plurality of inlets 41 which communicate with the chamber defined by the pan sections and housing 40. Such chamber further communicates through a set of hoses 42 through 45 with the interior of conduit 25 as best shown in FIG. 1. Also mounted on housing 40 is an electromechanical vibrator 43 which may be energized to vibrate the pan assembly and thus enhance the flow of material being unloaded from a bag resting on the pan assembly.

In the operation of the system as described, a bag filled with a bulk material to be unloaded and subsequently conveyed to another storage site or processing unit is transported to, usually by a forklift truck, and suspended from the upper end of the support frame with the lower, closed spout positioned in vertical alignment with opening 39 of the pan assembly. The spout is then opened, usually by undoing a rope holding the spout in a collapsed, closed condition, and the bag is lowered further so that the open spout projects through the pan assembly into the hopper and the shoulder portion surrounding the spout rests on the pan assembly. With the bag thus positioned, valve 23 is opened to permit material to gravity flow into the pump 21, pump 21 is activated to impel material fed into it through pneumatic conveying line 24 and airborne particles within the hopper are caused to be drawn up through conduit 25 and filtered out by filter 15. Any airborne particles escaping between the lower shoulder portion of the bag and the pan assembly are caused to be drawn through inlets 41, the manifold provided on the underside of the pan sections and hoses 42 through 45 to be conveyed through conduit 25 to filter 15. Filter 15 functions not only to capture dust laden particles from the hopper but also from the peripheral area between the bag and pan assembly to prevent contamination of the ambient atmosphere and enhance productivity. The elevation of the filter and the inlet of conduit 25 adjacent the upper end of the hopper precludes the obstruction of the filter elements and thus assures the capture of the airborne particles in the hopper. Periodically, the filter operates automatically to inject bursts of air through the filter elements to dislodge particles deposited on the filter media thereof, which particles are caused to gravity fall through conduit 25 into the hopper. The alignment of bottom wall 26 of conduit 25 with a sidewall of the hopper facilitates the flow of dislodged material through the hopper and into pump 21. Electromechanical vibrators 43 also are operated to enhance the flow of material out of the main portion of the bag and through the spout thereof into the hopper.

In lieu of a product pump as shown in FIG. 1, which is vented by means of a hose 46, various rotary airlocks and other devices may be used for receiving material from the hopper and conveying it to another vessel or a transport line.

By elevating the filter housing, filter elements, reverse air jet cleaning mechanisms and dust collecting air mover well above the materials entry point into the hopper, such parts are placed beyond the reach of fluidized material and are able to efficiently perform their intended functions. The filter element cannot become immersed in fluidized material which reduces the operating pressure across the filter media. This is important because excessive pressure loss across the filter media can greatly reduce the dust collecting air flow rate which can result in airborne particles being released into the work space. Furthermore, by preventing direct contact between the material being unloaded and the filter media fabric, erosion of the fabric and subsequent loss of filtration efficiency are avoided. In addition, since there is now only particle laden air completely surrounding the filter elements, the reverse cleaning air pulse system can completely and effectively dislodge collected particles back into the hopper.

The configuration of the described system is such that a narrow profile is provided making efficient use of plant space. This is an important feature in many plant locations where floor space and overhead space are at a premium or unavailable.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A bulk bag unloading system comprising:
   a support means;
   a hopper mounted on said support means;
   filtering means mounted on said support means at a level above said hopper;
   means intercommunicating the interior of said hopper, and an inlet of said filtering means; and
   means for suspending said bulk bag on said support means wherein a spout of said bulk bag communicates with an inlet of said hopper.

2. A system according to claim 1 wherein said filtering means is disposed laterally of a position occupied by said bulk bag when suspended by said support means.

3. A system according to claim 1 wherein said filtering means is operable to produce a negative pressure sufficient to draw airborne particles of bulk materials gravity fed into said hopper, into said filtering means.

4. A system according to claim 3 wherein said filtering means includes means for injecting reverse bursts of a gas through filter media thereof to dislodge filtered material particles from said media, causing said dislodged particles to flow through said interconnecting means into said hopper.

5. A system according to claim 1 wherein said hopper includes an outlet communicating with a pneumatic conveying line.

6. A system according to claim 1 including a product pump having an inlet communicating with an outlet of said hopper and an outlet communicating with a pneumatic conveying line.

7. A system according to claim 1 including a pan supported on said hopper, having an opening therein through which a spout of a bulk bag supported on said support system may project for gravity feeding material into said hopper.

8. A system according to claim 7 including means for vibrating said pan for inducing the flow of material out of said bag.

9. A system according to claim 7 including means for drawing airborne particles of material fed from a bulk bag suspended from said support means, into said hopper, escaping between said bag and said hopper.

10. A system according to claim 9 including means for vibrating said pan for inducing the flow of material out of said bag.

11. A system according to claim 9 wherein said means for drawing airborne particles of material fed from a bulk bag suspended from said support means includes means defining a chamber disposed peripherally relative to an opening in said pan through which the spout of a bag may be disposed, having at least one inlet communicating with a region between said bag and said hopper and an outlet, means intercommunicating said chamber and said means intercommunicating said hopper and said filtering means, and means for providing a negative pressure in said chamber causing said airborne particles to be drawn through said chamber and into said means interconnecting said chamber and said means interconnecting said hopper and said filtering means.

12. A system according to claim 10 including means for vibrating said pan.

13. A system according to claim 11 wherein said chamber includes a plurality of inlets spaced peripherally relative to an opening in said pan, functional to draw airborne particles of materials suspended between said bag and said pan.

14. A system according to claim 1 wherein said means intercommunicating said hopper and said filtering means is disposed at an obtuse angle to the horizontal.

15. A system according to claim 1 wherein said means intercommunicating said hopper and said filtering means includes a sloped surface lying in the same plane of a sloped surface of said hopper.

16. A system according to claim 9 wherein said filtering means is disposed laterally of a position occupied by said bulk bag when suspended by said support means.

17. A system according to claim 9 wherein said filtering means is operable to produce a negative pressure sufficient to draw airborne particles of bulk material fed into said hopper and drawn into said chamber, into said filtering means.

18. A system according to claim 1 wherein said means intercommunicating said hopper and said filtering means is provided with an inlet communicating with the interior of said hopper at an upper end thereof.

19. A system according to claim 1 including a product pump having an inlet communicating with an outlet of said hopper and an outlet communicating with a pneumatic conveying line.

20. A system according to claim 19 including means intercommunicating said product pump and said means intercommunicating said hopper and said filtering means for venting said product pump.

\* \* \* \* \*